July 29, 1930. W. JURGENSMEYER 1,771,792
ROLLER BEARING AXLE BOX
Filed Oct. 6, 1928
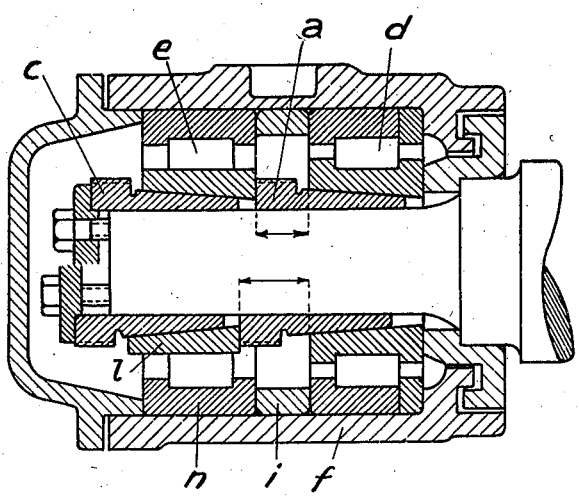
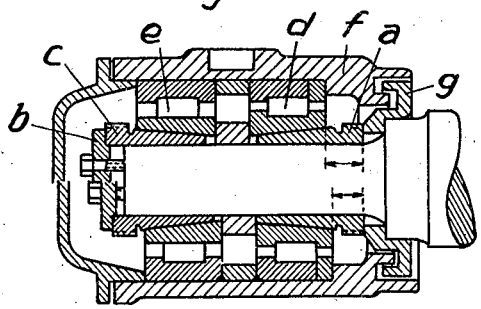
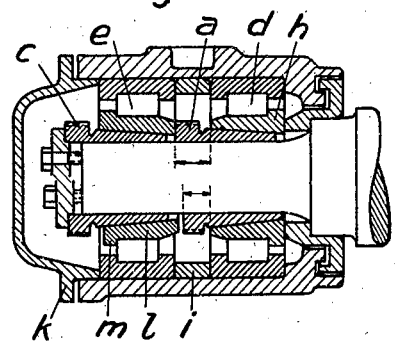
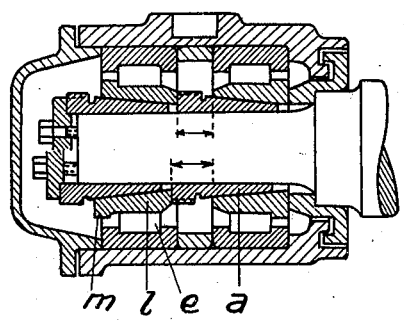
Inventor:
W. Jurgensmeyer Patented July 29, 1930

1,771,792

UNITED STATES PATENT OFFICE

WILHELM JURGENSMEYER, OF BERLIN, GERMANY, ASSIGNOR TO AKTIEBOLAGET SVENSKA KULLAGERFABRIKEN, OF GOTEBORG, SWEDEN

ROLLER-BEARING AXLE BOX

Application filed October 6, 1928, Serial No. 310,749, and in Germany October 21, 1926.

The present invention relates to a roller-bearing axle box in which cylindrical roller bearings are employed, which are secured to the axle journal by means of withdrawal sleeves.

Axle boxes with cylindrical roller bearings are in themselves known. The employment of withdrawal sleeves for roller bearings is also known, and has also already been employed in the case of cylindrical roller bearings.

The known devices have however the disadvantage that no satisfactory fixing of the axle box in position is possible. This however is absolutely indispensable, as a fitting together of the sets of wheels cannot be carried out with axle boxes and carriage bodies mounted thereon. It is in fact necessary to ensure the exchangeability of all the sets of wheels as otherwise regular operation cannot be maintained. On the other hand it is a very great advantage to be able to employ withdrawal sleeves, as the withdrawal sleeves ensure a faultless seating of the tread rings and permit of an easy drawing on and off of the bearings. Furthermore there is the great advantage that the axle journal allowance may be several times as great as in the case of rings that are pressed on, because the slotted clamping sleeves can compensate for considerable differences in dimensions.

It is therefore of rather great importance to be able to employ the device that is known for closed roller bearings also in the case of roller bearings that can be taken to pieces. When employing divisible cylindrical roller bearings however the condition must be fulfilled that the axle boxes are secured accurately in their positions in relation to the axle journals, and on the other hand the totally different method of working and type of construction of the bearings must be taken into consideration. For the introduction of cylinder roller bearings as axle box bearings the solution of this problem is therefore of paramount importance.

Now the invention consists in the fact that the outer roller bearing is an adjustable roller bearing with cylindrically constructed race and that the securing of the two roller bearings is effected by similarly directed clamping sleeves, the smaller diameter of which is remote from the end of the axle journal.

The invention is illustrated in Fig. 1 of the accompanying drawings as applied to an axle box shown in longitudinal section.

Fig. 2 shows a longitudinal cross section through an axle box, the roller bearing of which is secured in a known manner by withdrawal sleeves.

The longitudinal cross sections shown in Figs. 3 and 4 serve to explain the method of working of the invention.

If the bearings are secured in the usual manner as shown in Fig. 2, the rear withdrawal sleeve $a$ takes up a position against the labyrinth ring. By means of a clamping device $b$ the bearings are drawn tight upon the axle journal. In the case of the comparatively large allowance of the axle journal diameter, and taking into consideration the sources of error which occur on the conical surfaces of the two withdrawal sleeves $a$ and $c$, it is natural that the position of the cylinder roller bearings $d$ and $e$ is not accurately determined in an axial direction. Associated with this there is also a displacement of the axle box $f$ itself. This is a disadvantage in so far as the distance from the centre spring hole of the axle box to the corresponding centre of the other axle box must be constant. It would also be necessary to leave in the labyrinth ring $g$ sufficient clearance in an axial direction to prevent the axle box abutting against the labyrinth ring. How a displacement in an axial direction would work out is easily recognizable by comparing the lower half section of Fig. 2 with the upper half section.

From this example it is clear that the position of the axle box must be definite. It is therefore necessary, as illustrated in Figs. 3 and 4, to set the inner ring $h$ of the inner bearing against the labyrinth ring and to arrange both the withdrawal sleeves $a$ and $c$ for both bearings with the cones in the same direction. Now the position of the axle box, including that of the inner bearing $d$, is definite. The outer bearing $e$ and the associated withdrawal sleeve $c$ will then assume a position which depends upon the position in which the withdrawal sleeve $a$ is tightened up.

When employing shoulder roller bearings as illustrated in Figs. 3 and 4, however, further difficulties arise.

If for example the clamping sleeves turn out somewhat weak, they may be pushed into the bores in the inner ring of the bearing, as illustrated in the lower half of Fig. 3, so far that the outer bearing $e$ is jammed in an axial direction, because the shoulder $m$ is pressed against the end faces of the rollers. In that case it may happen that the inner ring of the outer bearing $e$ does not bear against the end face of the sleeve $a$ at all.

If on the contrary the clamping sleeves prove somewhat thick, the jamming of the sleeve $a$ takes place somewhat too soon, as shown in the lower half of Fig. 4, so that the axial fixing of the axle box does not occur, because the inner ring $l$ of the outer bearing $e$ already bears against the end face of the sleeve $a$ when its outer shoulder $m$ is still located at too great a distance from the end faces of the rollers.

Hence while in the lower half of Fig. 3 the distance of the outer shoulders of the inner ring is too small, according to the lower half of Fig. 4 it is too great.

The disadvantages arising in Figs. 3 and 4 might be obviated by making the distance sleeves $i$ between the outer rings of the bearings $d$ and $e$ always of different lengths. This however is impossible in the case of series manufacture. Furthermore the cover projection $k$ would have to be a different length.

The present invention extends to the prevention of the sources of error set forth above. The construction is shown in Fig. 1. What is necessary here is the supporting of the axle box by means of a guiding roller bearing $d$ and an adjusting roller bearing $e$. The clamping by means of withdrawal sleeves $a$ and $c$ is effected as in Figs. 3 and 4. The position of the guiding roller bearing $d$ of the axle box $f$ is thereby determined. For the intermediate sleeve $i$ between the outer rings a definite length is provided, which does not alter, so that the position of the outer ring $n$ of the bearing $e$ is also determined. Only the inner ring $l$ of the bearing $e$ is variable in an axial direction. The lateral displacement of the inner race track is here made possible by the fact that the race is itself cylindrical. In the case of railway axle boxes for example a lateral displacement of the inner ring by from 2-3 millimetres on either side must be possible. Only in this way, as illustrated in Fig. 1, is the employment of cylinder roller bearings practicable at all in the case of axle boxes by means of a withdrawal sleeve. In the case of other constructions (Figs. 2 to 4) sources of error arise which cannot be allowed.

What I claim is:—

An axle box for use in conjunction with an axle journal, comprising in combination a plurality of roller bearings, of which the outermost has its inner and outer race members axially adjustable with respect to one another and a plurality of similarly directed conical clamping sleeves, one associated with each roller bearing for securing the said roller bearing to the axle journal, each of the said conical clamping sleeves having its smaller diameter remote from the free end of the axle journal.

In testimony whereof I have signed my name to this specification.

WILHELM JURGENSMEYER.